United States Patent [19]
Moll

[11] Patent Number: 5,564,405
[45] Date of Patent: Oct. 15, 1996

[54] REGULATING METHOD FOR OPTIMIZING EMISSION OF POLLUTANTS FROM A COMBUSTION SYSTEM

[75] Inventor: Günter Moll, Fellbach, Germany

[73] Assignee: Mercedes-Benz AG, Germany

[21] Appl. No.: 541,873

[22] Filed: Oct. 10, 1995

[30] Foreign Application Priority Data

Oct. 10, 1994 [DE] Germany .................. 44 36 085.1

[51] Int. Cl.⁶ .................................................. R02D 41/00
[52] U.S. Cl. .................................................. 123/679
[58] Field of Search .................................. 123/679, 682

[56] References Cited

U.S. PATENT DOCUMENTS

| | | | |
|---|---|---|---|
| 5,249,562 | 10/1993 | Klenk et al. | 123/679 |
| 5,253,630 | 10/1993 | Akazaki et al. | 123/682 |
| 5,335,643 | 9/1994 | Abate et al. | 123/679 |
| 5,381,775 | 1/1995 | Birk et al. | 123/679 |
| 5,485,826 | 1/1996 | Ohata et al. | 123/679 |

FOREIGN PATENT DOCUMENTS

4215942A1  12/1992  Germany ................. 123/679

*Primary Examiner*—Raymond A. Nelli
*Attorney, Agent, or Firm*—Evenson, McKeown, Edwards & Lenahan P.L.L.C.

[57] ABSTRACT

The invention relates to a method for optimizing exhaust quality of a combustion system, especially an internal combustion engine, wherein measured pollutant quantities in the exhaust are used to regulate the combustion system. According to the invention, the quantities of at least two pollutant components in the exhaust are measured using sensors, and a weighted composite signal is determined based on the measured quantities. This weighted composite signal is then set to a minimum by controlling an operating parameter that influences the exhaust composition. Such minimization can be performed continuously and sequentially as needed for a plurality of operating parameters that influence the exhaust composition.

10 Claims, 3 Drawing Sheets

REGULATING METHOD FOR OPTIMIZING EMISSION OF POLLUTANTS FROM A COMBUSTION SYSTEM

BACKGROUND AND SUMMARY OF THE INVENTION

The invention relates to a method for optimizing the emission of pollutants from a combustion system, especially an internal combustion engine.

German Patent Document DE 42 15 942 A1 teaches a device for monitoring the concentration of a plurality of pollutants contained in the exhaust from an internal combustion engine. The concentrations of oxides of nitrogen and hydrocarbons in the exhaust are adjusted to a given ratio at which a NOx reduction catalyst provided in the exhaust line operates with maximum efficiency. However, a disadvantage of this method is the fact that the emission of pollutants from the engine is not directly minimized; rather, better operating conditions for a catalyst located downstream are produced, so as to control emissions indirectly.

Particularly in internal combustion engines, many methods are known for regulating exhaust composition. Individual operating parameters that influence the exhaust composition are controlled or regulated as a function of the operating state or the percentage of an individual pollutant component in the exhaust. However changing an operating parameter generally influences not only one of the pollutant components but several of them, and inverse proportionalities often exist. Therefore, in the individual regulating or control methods, frequently the reduction of one pollutant component results in an increase in another pollutant component.

The goal of the present invention therefore is to provide a simple method for optimizing the emission from an internal combustion system, of pollutants that contain a plurality of pollutant components.

This goal is achieved by the emission control method according to the invention, in which a weighted composite signal is determined based on the measured amounts of detected pollutants, and this signal is then minimized by adjusting at least one operating parameter that influences exhaust composition.

The method according to the invention has the advantage that only one regulating input signal which more or less directly represents the quality of the exhaust is used to adjust the operating parameters that influence exhaust composition. If a plurality of such operating parameters must be adjusted, this is possible in a single common regulating process.

Since the definition of exhaust quality criteria is not a fixed value, but depends on legal guidelines or influences of society, it can thus can vary both regionally and with time. Another important advantage of the method, according to the invention, therefore, is that determination of the total signal can be adjusted in a simple manner to accommodate varying conditions. When a weighted summation of the individual pollutant components is used, for example, this can be done simply by varying the values of the weighting factors.

Using starting characteristic maps for the operating parameters can accelerate the regulating process. Moreover, if self-learning characteristic maps are used, the influence of parameters that change slowly, for example as a result of the aging process, can be eliminated.

The invention is described below for a method with two adjustable operating parameters, with reference to a drawing that shows a family of curves that represent exhaust quality as a function of the operating parameters to be adjusted. It is of course apparent that the method according to the invention can be readily adapted to accommodate other systems having more than two such parameters, and other families of operating characteristics.

Other objects, advantages and novel features of the present invention will become apparent from the following detailed description of the invention when considered in conjunction with the accompanying drawings.

DETAILED DESCRIPTION OF THE DRAWINGS

Figure 1:
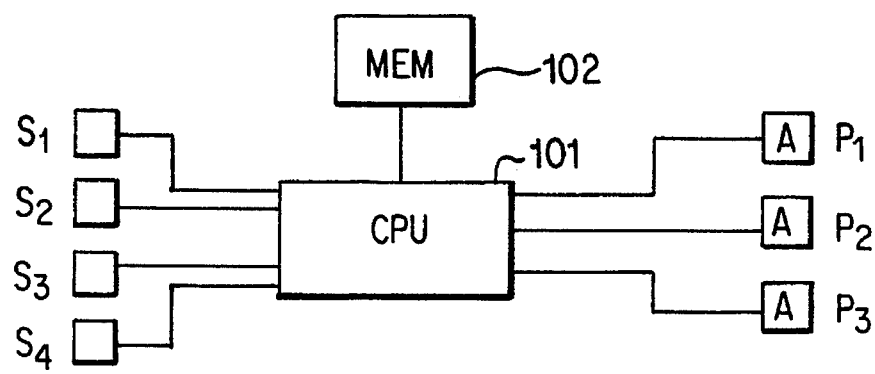
FIG. 1 is a block diagram which illustrates an embodiment of apparatus for performing the method according to the invention.

An important aspect of the method according to the invention is the determination of a parameter that characterizes the exhaust quality of the combustion system. The percentages $s_i$ of various pollutant components contained in the exhaust are determined quantitatively with the aid of one or more sensors that are either located directly in the exhaust or are connected by suitable collecting points with the exhaust line, in a conventional manner. In a control device a weighted total signal is then calculated from these individual pollutant components $s_i$. For example, one possible way to calculate to calculate S is by a simple weighted summation as follows:

$$S = \Sigma_i a_i * s_i$$

where $a_i$ represents preset weighting factors. According the invention, however, any other calculation algorithm can be used to calculate total signal S, for example using products, ratios, or powers of pollutant components $s_i$.

The choice of a suitable algorithm, or suitable weighting factors $a_i$, depends on the definition of the term "exhaust quality." This definition need not be made uniformly but can differ regionally or with time, for example due to differing legal limits. The choice of the algorithm or weighting factors $a_i$ affects the ratio of the admissible pollutant components $s_i$. Pollutant components which are tolerable are weighted less heavily while other pollutant components which are extremely dangerous are weighted extremely heavily.

Measurement of pollutant components $s_i$ can be accomplished with either individual pollutant sensors or a single exhaust quality sensor which reacts not only to one specific pollutant but to a plurality thereof. Sensitivities to the individual pollutants, the so-called cross sensitivities, can either be permanently set when the sensor is manufactured or can be adjusted during operation from outside for example by a control device. When such a control device is used, it is also possible to correct for any temperature sensitivities of the sensor that develop. Finally it is also possible to link the total signal S with other parameters. For example, the product of the total signal S and the exhaust volume produced per unit time may be used as a regulating value. In this case the regulation would govern not only the exhaust composition, but also the absolute quantities of pollutants.

One area of application for the method according to the invention is optimizing the exhaust quality of internal combustion engines. Among the operating parameters P that influence the exhaust composition are, for example, exhaust recycling, exhaust throttling, secondary air supply, exhaust reheating, catalyst heating, intake air volume, intake air throttling, air preheating, charging, air temperature, transmission control, fuel volume, injection time, fuel temperature, ignition timing, or control times for charge-changing valves. The percentages of various exhaust pollutants, (for example oxides of nitrogen NOx, carbon monoxide CO, and hydrocarbons HC) are measured from which a weighted total signal S is then obtained. If the weighted summation described above for the total signal S are used, the corresponding weighting factors $a_i$ can be adjusted to the valid limits. For example if the limit for carbon monoxide CO is about three times higher than the limit for oxides of nitrogen $NO_x$, the weighting factor $a_{NOx}$ for the oxides of nitrogen NOx can be made three times as high as the weighting factor $a_{CO}$.

The operating parameters P that influence exhaust composition are then constantly adjusted so as to maintain the total signal S at a minimum value. One simple method consists in adjusting the first operating parameter P stepwise and then determining by a relative comparison whether the direction of adjustment was correct or not (that is, whether the value of S decreased or increased). This is continued until the optimum adjustment is found for the first operating parameter P, in other words until the total signal S reaches its local minimum. Then these steps are repeated for all other operating parameters P. When all of the pertinent operating parameters P have been processed in this manner, the process starts again with the first operating parameter P since under the changed boundary conditions this might require a different optimal adjustment, as explained below.

Since this method does not involve absolute but only relative sensitivity of the sensor to different pollutant components, scattering or aging effects on the absolute sensitivity of the sensor are not significant. That is, the measurements at different points in time are not evaluated absolutely, but only relative to one another. In this way manner, manufacturing cost of the sensors can be more economical or at least the rejection rate, can be reduced.

FIG. 1 is a block diagram which shows the configuration of a hardware system suitable for performing the method according to the invention. In this arrangement, four sensors S1–S4 are provided for measuring the quantity of various pollutant components in the exhaust gas emissions. (As noted previously, these sensors may be replaced by a single exhaust quality sensor which responds to a combination of pollutants.) The measured quantities are provided to the central processing unit 101 which calculates the value of S and adjusts the respective parameters P1–P3 by means of the actuators A in order to optimize the exhaust gas quality, according to the method described in detail below. A memory 102 is provided for storing characteristic maps containing starting values for the respective parameters as explained in greater detail hereinafter.

Figure 2:
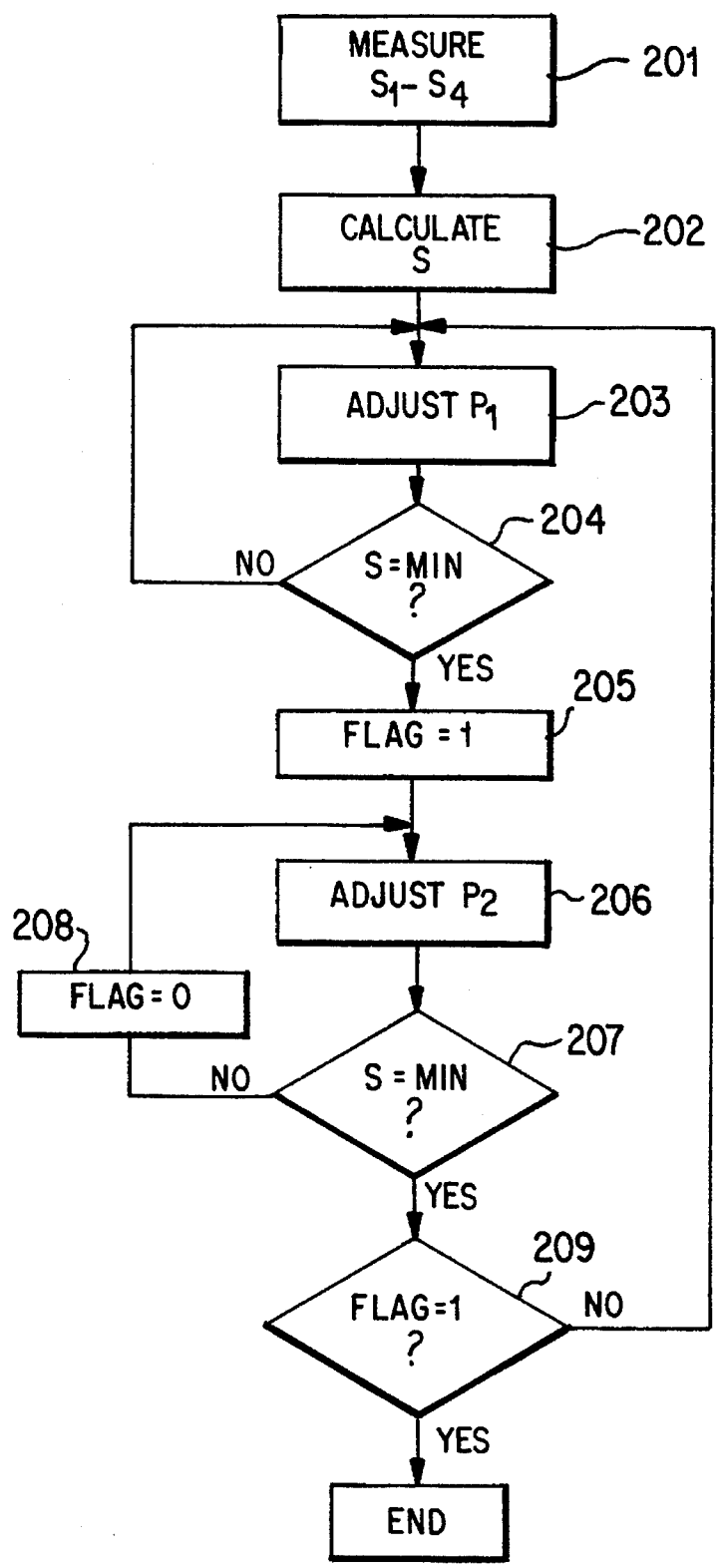
FIG. 2 is a flow chart which shows the process according to the invention.

FIG. 2 is a flow chart which illustrates the operating principles of the method according to the present invention. At step 201, the quantities of S1–S4 of the respective exhaust pollutant components are measured, and the weighted composite value S is calculated in step 202 in a manner described previously. At step 203, the first parameter P1 is adjusted, and in step 204 it is determined whether the calculated value of S has reached a minimum value. If not, step 203 is repeated until S reaches a minimum value for the current set value of the parameter P2. When this occurs, a flag is set to 1 in step 205, and the parameter P2 is adjusted in step 206. Thereafter, an inquiry is made in step 207 whether S has a reached a minimum value for the present setting of the parameter P1. If not, the flag is set to 0 in step 208, and step 206 is repeated until S achieves its minimum value. At this point, in step 209, if the flag is set to 1 (indicating that P2 has immediately reached a minimum value), the process is ended. If not, the processing returns to step 203, and steps 203–209 are repeated. It should be noted that the entire process is repeated at regular intervals, or continuously, depending on the operating environment of the system.

Figure 3:
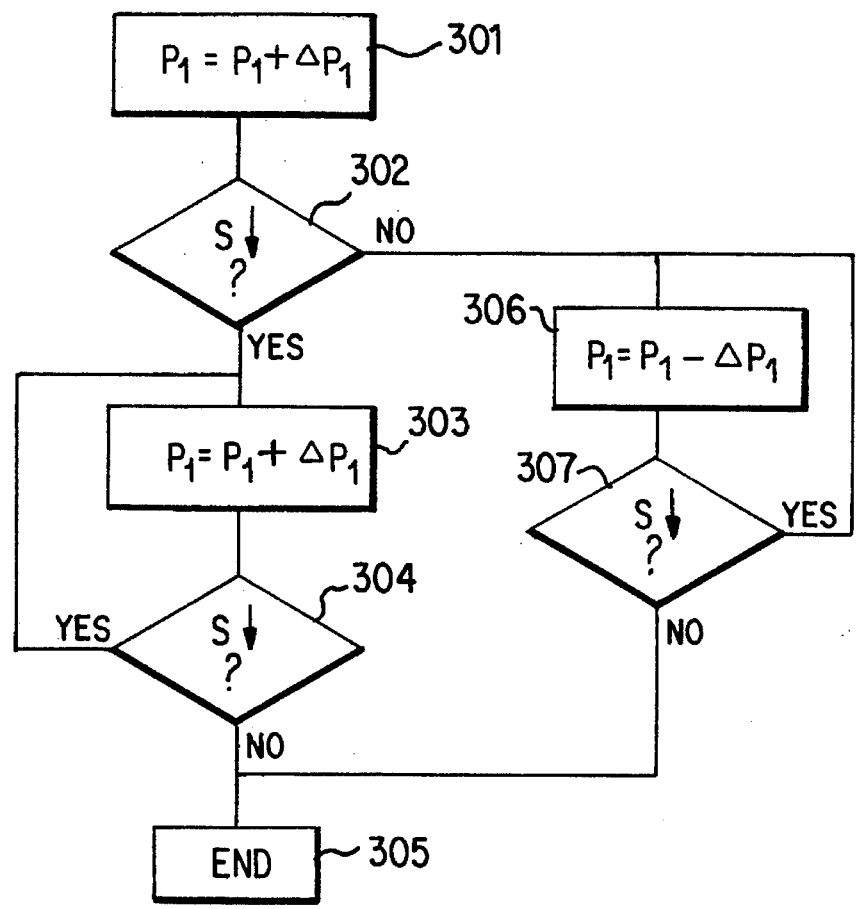
FIG. 3 is a flow chart which shows in more detail the process in steps 203 and 204 in FIG. 2.

FIG. 3 is a flow chart which illustrates in greater detail, one embodiment of the process in steps 203 and 204 in FIG. 2. In step 301, the parameter P1 is adjusted by adding an increment $\Delta P1$ and in step 302 it is determined whether S decreased as a result of such adjustment. If so, then P1 is further adjusted in the same direction in steps 303 and 304, until S no longer decreases, and the process ends. If, on the other hand, the adjustment of P1 in step 301 resulted in an increase of S rather than a decrease, then in steps 306 and 307, P1 is adjusted in the opposite direction, by subtracting the increment P1 until S no longer decreases in step 307, whereupon the process ends. A similar process can be used in performing steps 206 and 207 of FIG. 2.

Figure 4:
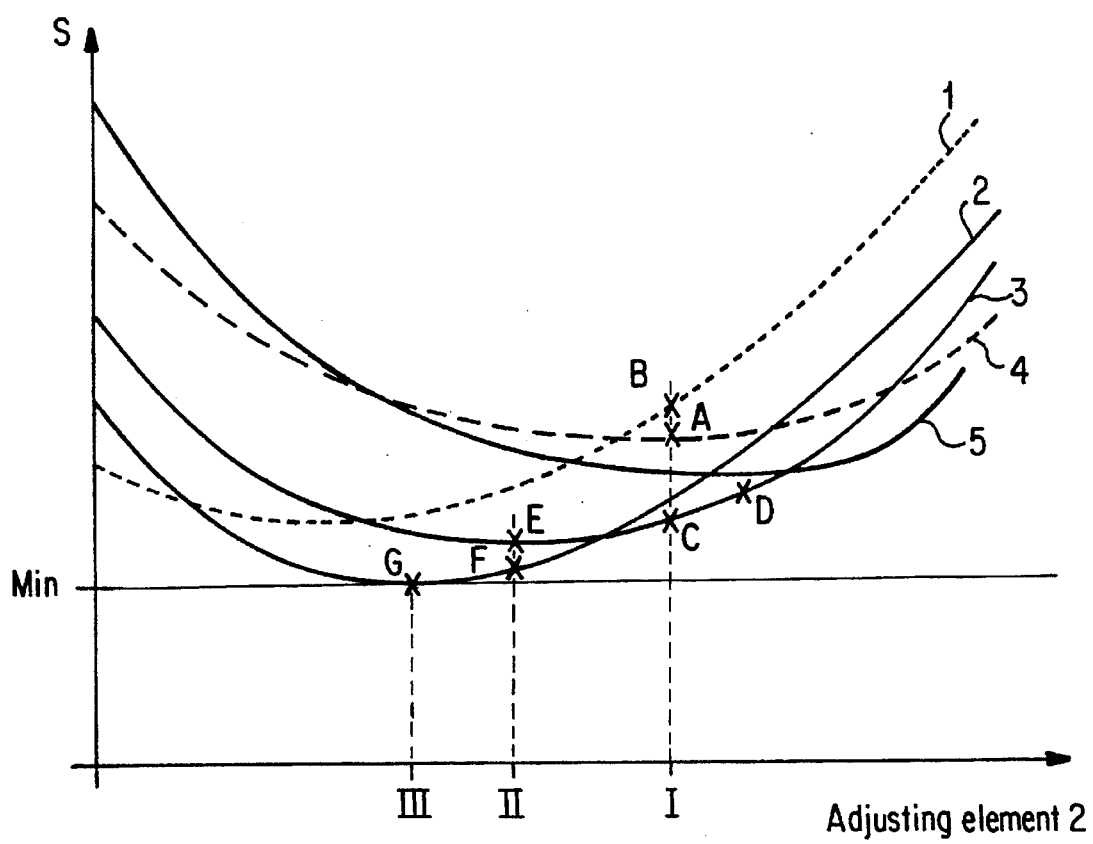
FIG. 4 shows a family of characteristic curves which represent exhaust pollution S as a function of two engine parameters.

FIG. 4 shows a family of curves which illustrate the operation of the method shown in FIG. 2, for stationary combustion engine, in which two operating parameters are changed by suitable adjustment elements. Here the total signal S, at various positions of a first adjusting element, is shown as a function of the position of a second adjusting element, which is plotted on the abscissa. Each of the curves 1–5 thus represents the value of S for a particular position of the first adjusting element as a function of the second adjustment, so that by changing the setting of the first adjusting element, it is possible to select from among curves 1–5.

The adjusting process begins at point A, with the second adjusting element being fixed at a value I. The first adjusting element is then moved in any direction for example toward point B. (That is, as a result of this change in the first adjusting element the signal S changes from curve 4 to curve 1 in the drawing.) Because this adjustment led to a deterioration of exhaust quality (an increase of the total signal S), the direction of adjustment was reversed and the first adjusting element reached the position C (curve 3) in which the total signal S has a local minimum.

In the next step, the first adjusting element was then held constant, so that the curve 3 shows the total signal S as a function of the position of the second adjusting element for this position of the first adjusting element. Thereafter, the second adjusting element is adjusted in any direction, thus varying S along curve 3, for example toward point D. Because this led to a deterioration of total signal S, the adjustment direction was reversed. The second step ended when the minimum value of the total signal S for the current fixed position of the first adjusting element was reached at position E (position II. of the second adjusting element).

In the third step, the second adjusting element was held at position II and the first adjusting element was adjusted, changing S from curve 3 to curve 2, thus reaching position F the minimum of total signal S at the fixed position II of the second adjusting element. In the last step, the first adjusting element was then kept in place so that curve 2 represents total signal S as a function of the position of the second adjusting element. The absolute minimum of the total signal S was then reached by changing the second adjusting element to position III. At this point the optimization process can be interrupted for a fixed combustion system.

In dynamic systems such as an internal combustion engine in a motor vehicle, this process must be performed constantly, since there is no absolute minimum for the total signal S. That is, the minimum for total signal S depends on additional operating parameters, such as the load or the rpm of the internal combustion engine. Since these operating parameters are changing constantly, the regulating method must adjust the operating parameters P that influence the exhaust composition constantly to changing boundary conditions.

In applications with high dynamics and with many operating parameters P to be adjusted, it is possible for the pure regulating process to react too slowly. In this case, the regulating method can be combined with a second control method. The control makes a coarse preadjustment of the adjusting element as a function of the system operating point, while the regulation using the optimization method described above is used only for fine adjustment. Starting values $P(t_0)$ for the individual operating parameters P, for example, can be plotted as a function of the operating point in characteristic maps $K_i$, which may be stored, for example, in memory 102 in FIG. 1. During fine adjustment, scatters or disturbances values that control alone would not pick up can be compensated. Since some of these disturbances, for example those caused by manufacturing tolerances or aging processes, have low dynamics (in other words would always cause the same corrections to the control adjustment to be made by regulation), a control that is capable of learning can additionally make the last adjusting element setting that was detected as optimal at any operating point in the characteristic maps $K_i$. Thus freed from the control tasks proper, the optimization method can then operate with a relatively high dynamic.

In order to rule out malfunctions of the combustion system, acceptable parameter ranges can be set as a function of the operating point for the individual operating parameters $P_i$ as well. As an additional limitation, maximum values can also be set for individual pollutant components $s_i$. This technique can ensure not only that exhaust quality is used as a regulating parameter in the method, but also that set limits for individual extremely dangerous pollutant components can under no circumstances be exceeded.

One important advantage of the method according to the invention lies in the fact that the calculation guidelines for the total signal S (and hence the control strategy) can be adjusted simply and thus individually for the respective application. Using the sample application in a motor vehicle, therefore, it is possible to adjust the system to accommodate different limitations imposed by different countries, or within a single country (especially for retrofitting used automobiles). Such adjustment can be made in two ways without changing the engine or the calculating guidelines. In systems which use an exhaust quality sensor which detects total exhaust quality, the sensor can be replaced. In an exhaust quality sensor in which the total exhaust quality signal S is calculated in a separate control device, the sensor itself need not be replaced. Rather, only the control device needs to be recoded, reprogrammed, or replaced.

When using a control device, it is also easy to take account of different requirements in different states, by varying the calculation of the composite signal S, such as, for example, by using different weighting factors stored in the control device, for city driving or for going through tunnels, reflecting the risk potential of the individual pollutant components for human beings. Finally the calculation algorithm or factors can be changed when crossing frontiers with different limits, for example smog or even national frontiers. The switchover process can be activated in different ways. Smog limits for example can be detected by means of a smog sensor in the air conditioner whereby an appropriate signal is then passed to the control device. To detect city driving the speed signal can also be evaluated. Finally it is also possible by using suitable transmitting stations at the edge of the road to alert the control device that it has passed a corresponding frontier and at the same time transmit the new limits that are applicable. This embodiment is especially advantageous for city limits and state frontiers as well as driving through tunnels. For example the transmitting and receiving stations of traffic control systems can be used whereby in this case additional information, for example about the traffic situation, can be taken into account.

In addition to the described embodiment, in a motor vehicle, this method can of course be used for any type of combustion system that has at least a possibility of exhaust-relevant regulating intervention. This includes for example domestic or industrial heating systems, turbines, or chemical or processing systems. In addition the method should not be limited to the sequential optimization of the individual adjusting element positions as described above, but can also include any other minimization processes for example with multidimensional gradient formation.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for optimizing exhaust quality of exhaust emissions from a combustion system in which exhaust emissions have a composition that is influenced by at least one operating parameter of said combustion system, said method comprising the steps of:

detecting quantities of at least two pollutant components contained in said exhaust emissions;

generating a weighted composite signal determined as a function of said quantities of said at least two pollutant components;

adjusting at least one operating parameter of said combustion system as a function of said quantities of said pollutant components so that said weighted composite signal is set to a minimum value thereof.

2. Method according to claim 1 wherein the weighted composite signal is determined by adding said quantities of said at least two pollutant components.

3. Method according to claim 1 wherein said quantities of said at least two pollutant components are each weighted by predetermined factors to form said weighted composite signal.

4. Method according to claim 3 wherein predetermined weighting factors can be changed as a function of at least one of the following operating parameters: ambient conditions, and/or legal regulations.

5. Method according to claim 1 wherein said at least one operating parameter comprises a plurality of operating parameters and wherein said adjusting step comprises:

adjusting each of said plurality of operating parameters to set said weighted composite signal to a minimum for each of said plurality of operating parameters; and repeating said adjusting step continuously and sequentially.

6. Method according to claim 1 wherein starting values for the operating parameters are stored in a characteristic map.

7. Method according to claim 6 wherein the characteristic maps are adjusted adaptively.

8. Method according to claim 1 wherein admissible parameter ranges for the operating parameters are set as a function of the operating point.

9. Method according to claim 1 wherein limiting values are set for individual pollutant components.

10. Method according to claim 1 wherein the quantities of pollutant components are standardized to the volume of exhaust gas per unit time.

* * * * *